United States Patent [19]

Kephart

[11] Patent Number: 5,447,675

[45] Date of Patent: * Sep. 5, 1995

[54] METHOD AND APPARATUS FOR FORMING PLASTIC PANELS FROM RECYCLED PLASTIC CHIPS

[75] Inventor: Edward L. Kephart, Alexandria, Minn.

[73] Assignee: Recycled Plastics, Inc., Garfield, Minn.

[ * ] Notice: The portion of the term of this patent subsequent to Sep. 13, 2011 has been disclaimed.

[21] Appl. No.: 234,054

[22] Filed: Apr. 28, 1994

Related U.S. Application Data

[63] Continuation of Ser. No. 22,230, Feb. 25, 1993, Pat. No. 5,346,171.

[51] Int. Cl.$^6$ .............................................. B41B 11/60
[52] U.S. Cl. ............................ 264/259; 264/331.11; 249/156
[58] Field of Search .................... 264/259, 331.11; 249/156, 79, 102, 155

[56] References Cited

U.S. PATENT DOCUMENTS

| | | | |
|---|---|---|---|
| 2,428,659 | 10/1947 | Falk et al. | 249/79 |
| 2,428,660 | 10/1947 | Falk et al. | 249/79 |
| 2,699,127 | 1/1955 | Orosz | 249/155 |
| 3,291,873 | 12/1966 | Eakin | 249/141 X |
| 3,453,950 | 7/1969 | Pfeiffer | 249/79 X |
| 3,502,135 | 3/1970 | Wertli | 249/79 X |
| 3,937,863 | 2/1976 | Moore | 428/410 |
| 3,946,982 | 3/1976 | Calkins et al. | 249/102 |
| 4,279,401 | 7/1981 | Ramirez et al. | 249/139 |
| 4,293,511 | 10/1981 | Vernon | 249/82 X |
| 4,333,897 | 6/1982 | Hayashi et al. | 264/40.6 |
| 4,359,443 | 11/1982 | Michaels | 264/328.2 |
| 4,401,614 | 8/1983 | DeSantis | 264/109 |
| 4,416,604 | 11/1983 | Bender et al. | 249/102 X |
| 4,419,307 | 12/1983 | Kohara et al. | 264/46.5 |
| 4,556,377 | 12/1985 | Brown | 425/138 |
| 4,562,026 | 12/1985 | Mosher | 264/135 |
| 4,781,555 | 11/1988 | Cook | 425/4 R |
| 4,891,176 | 1/1990 | Drysdale et al. | 264/250 |
| 4,964,943 | 10/1990 | Kruger et al. | 156/498 |
| 5,051,224 | 9/1991 | Donatelli et al. | 264/257 |
| 5,080,854 | 1/1992 | Kateh et al. | 249/82 X |
| 5,255,889 | 10/1993 | Collette et al. | 249/155 X |
| 5,286,421 | 2/1994 | Avai | 264/1.7 |

FOREIGN PATENT DOCUMENTS 1212785 11/1970 United Kingdom .

Primary Examiner—James C. Housel
Assistant Examiner—Harold Y. Pyon
Attorney, Agent, or Firm—Haugen and Nikolai

[57] ABSTRACT

A thermoplastic mold for creating large sheets of building materials from recycled plastic. The mold is adapted to be used with a platen press, and has an adjustment feature for defining a mold cavity of a selected thickness. A pair of shims are preferably used to establish the mold cavity, wherein the cavity has a depth identical to the thickness of the shims. The top member or lid of the mold has an integrally defined passageway for allowing a cooling fluid to be circulated therethrough to cool the mold after a molding process. In the one embodiment, the lid has a pair of flanges extending over and engaging the shims, and an alternative embodiment the lid comprises a rectangular plate having handles defined at selected locations in the upper surface for facilitating removal of the lid from mold recess. The sheets can be colored on one or both sides by inserting a thin sheet of colored thermoplastic material in the mold prior to pressing.

14 Claims, 3 Drawing Sheets

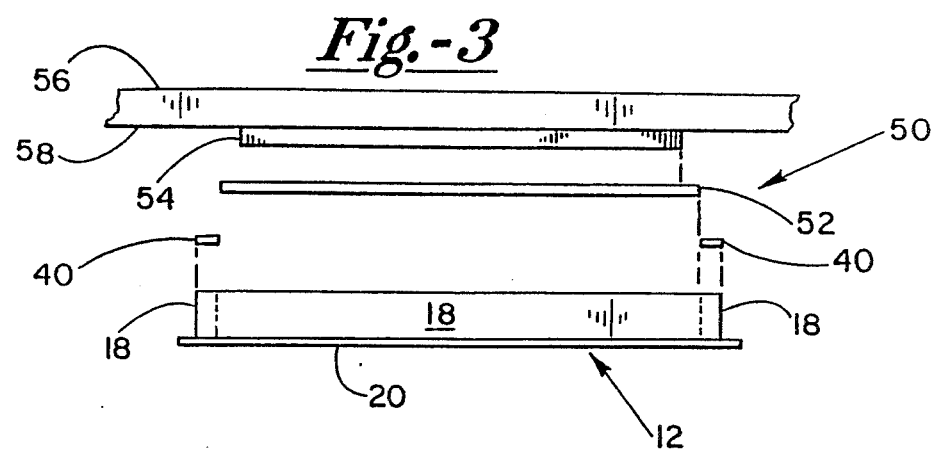
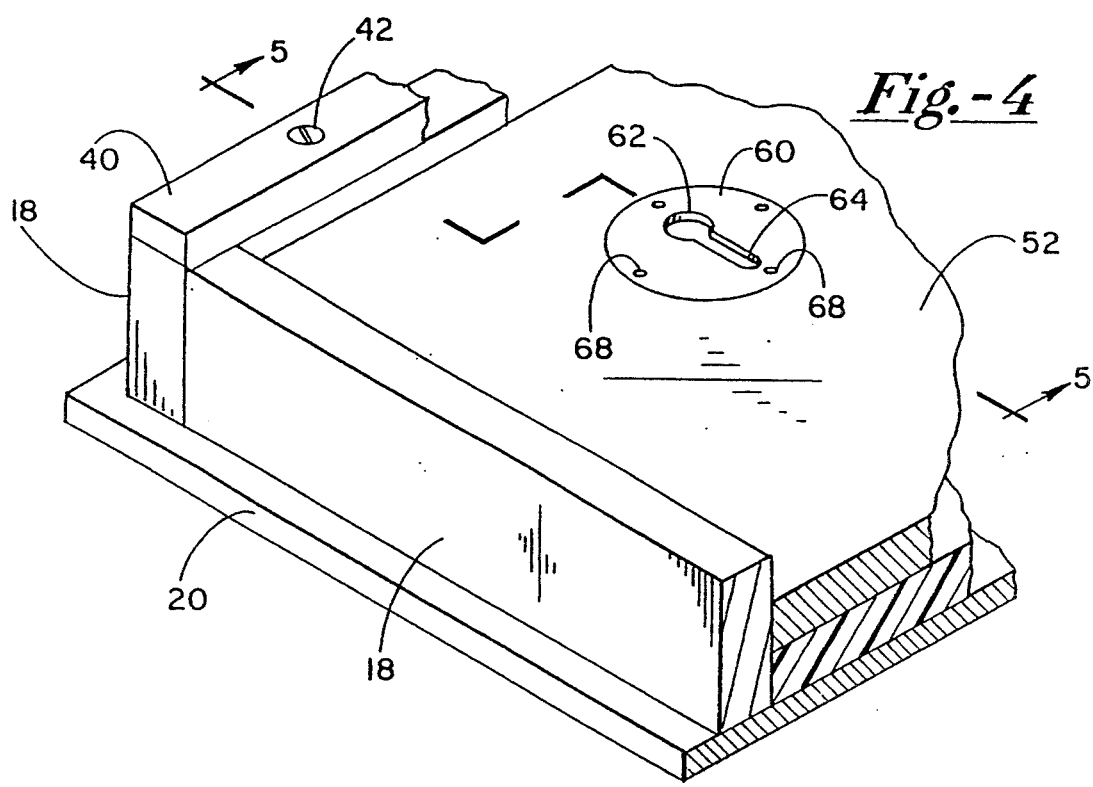
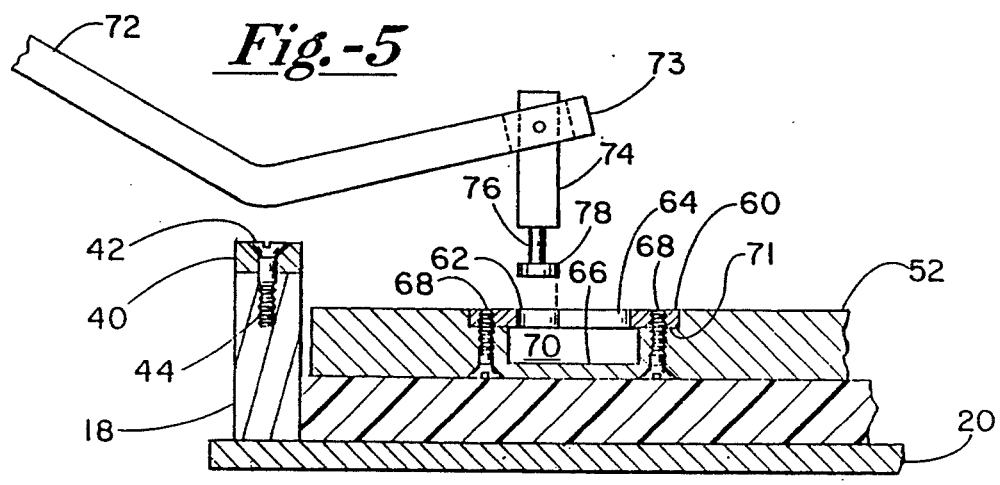

METHOD AND APPARATUS FOR FORMING PLASTIC PANELS FROM RECYCLED PLASTIC CHIPS

This is a Continuation of application Ser. No. 08/022,230, now U.S. Pat. No. 5,346,171 filed on Feb. 25, 1993.

I. Field of the Invention

This invention relates generally to a mold for forming objects, and more particularly to a mold adaptable to a platen press for forming plastic objects from recycled thermoplastic chips.

II. Background of the Invention

Plastic materials are widely used throughout the industry to form a variety of products. Some of the desirable features of plastic include its durability, strength, ease of manufacture, relative low cost, and that it is water impermeable. The uses of plastic are almost limitless, finding uses in toys, containers, tools, and even automobiles and engine components. However, plastic is not biodegradable and has a decay rate of well over 100 years, depending on the particular type of plastic material.

Landfills are filling up at an alarming rate. Community and state efforts have been undertaken to reduce the amount of waste being deposited in landfills to conserve landfill space. Recycling programs are now instituted in most communities throughout the country. By recycling plastic materials, the amount of landfill space needed for waste is reduced. Further, natural resources are conserved by reusing previously manufactured plastic materials. Recycling has a further advantage of reducing the amount of energy required to produce new products. Thus, communities will continue to implement recycling programs.

One limitation of recycling plastic materials is that not all previously manufactured plastic materials are suitable for all recycled products. For instance, recycled plastic milk jugs can only be recycled to form certain plastic objects. Most plastic items have a recyclable plastic code defined thereon identifying the particular type of plastic used to facilitate sorting plastic items of like plastic material. Milk jugs, for instance, typically are labeled with the code "2". Generally speaking, most plastic materials which are classified as thermoplastic materials, in contrast to thermoset plastic, can be recycled.

OBJECTS

It is accordingly a principle object of the present invention to provide a thermoplastic mold adapted to create building materials from thermoplastic materials.

It is a further object of the present invention to provide a thermoplastic mold adapted to create plastic building panels from recycled plastic chips.

Still yet a further object of the present invention is to provide a single thermoplastic mold adapted to create plastic building panels of selectable thicknesses.

Another object of the present invention is to provide a thermoplastic mold adapted to be used with commercially available platen molding presses.

Still yet a further object of the present invention is to provide a thermoplastic mold with an integrally defined cooling mechanism for quickly cooling the mold to increase the molding rate when used in a molding press. Such a mold should be easy to use, and quickly opened and closed to facilitate a large manufacturing output rate.

Other objects, features and advantages of the present invention will become apparent to those skilled in the art through the Description of the Preferred Embodiment, Claims, and drawings herein.

SUMMARY OF THE INVENTION

The foregoing features and objects of the present invention are achieved by providing a thermoplastic mold having a top member which can be selectively disposed above a bottom member to form a cavity therebetween having a selectively defined height dimension. Thus, plastic building panels of selectable thicknesses can be created from recycled thermoplastic chips using a single mold, wherein the top member can be quickly and easily adapted to or removed from the bottom member to facilitate a high capacity production. The thermoplastic mold comprises a bottom member having a bottom surface and a plurality of side walls together defining a recess. The side walls each have an inner surface facing the recess defining a recess profile, and each have a top surface. A top member is adapted to be selectively received within the recess of the bottom member. The top member has a profile substantially identical to the profile defined by the inner walls of the bottom member. Thus, the top member can be received within the recess of the bottom member to define a cavity therebetween. An adjustment mechanism is provided for selectively establishing the depth of the cavity defined between the top and bottom members to facilitate creating plastic building panels of a desired thickness.

Preferably, the adjustment mechanism comprises the top member having a pair of flanged edges each extending over the top surfaces of opposite bottom member side walls. Ideally, shims are implemented for establishing a selectable spacing between the top member flanged edges and the side wall top surfaces of the bottom member. Each of the pair of shims has an equal thickness, and preferably extends the entire length of the respective opposing side walls. An elongated rectangular shim is preferred. The height dimension of the shims thus define the thickness of the resulting panel.

The invention further comprises the top member having a cooling mechanism forming a portion thereof. Preferably, the cooling mechanism is defined integral to the top member, and comprises an elongated passageway extending between a pair of openings and within the top member proximate a substantial portion of a bottom surface of the top member. This elongated passageway facilitates a fluid to be circulated therethrough, such as air or a liquid, to remove heat from the top member bottom surface upon completion of the molding process. Preferably, this elongated passageway is defined by a plurality of vertically oriented plates spaced from one another and disposed within a lid cavity defined in the top member. One end of alternating plates are spaced from a common cavity wall to define a ribbon-like passageway within the upper member. In the preferred embodiment, each opening of the passageway extends through an upper surface of the top member to facilitate injecting and removing the cooling fluid.

The top member includes a handle for facilitating easy and quick removal of the top member from the bottom member after molding. Ideally, the handles are disposed in each of the corners of a rectangular top member.

Plastic building panels having a uniform colored surface can be created by inserting a thin layer of colored extruded thermoplastic material in the mold prior to placing thermoplastic chips therein. The chips and the colored plastic sheet will melt together and bond when the mold is heated and compressed by the platen press. An appropriate quantity of plastic chips is established by measuring weight, such that a given weight of chips will realize a plastic sheet of pre-determined dimensions and uniform thickness.

BRIEF DESCRIPTION OF THE DRAWINGS

FIG. 3 is a side view of a mold according to an alternative embodiment of the invention implementing a top member comprised of a rectangular sheet and compressed by a platen press;

FIG. 4 is a sectional view of the assembled thermoplastic mold of the alternative embodiment shown in FIG. 3 illustrating the top member received within the bottom member to define a cavity of preselected height, wherein the top member has handle formed by a disc to facilitate removing the lid from the bottom member after the molding process;

FIG. 5 is a side sectional view of section 5—5 shown in FIG. 4 illustrating a pry bar adapted to engage the handle shown in FIG. 4;

FIG. 6 is a perspective view of an alternative embodiment of the handle shown in FIG. 4 for receiving a pry bar, hoist hook or the like.

DESCRIPTION OF THE PREFERRED EMBODIMENT

Figure 1:
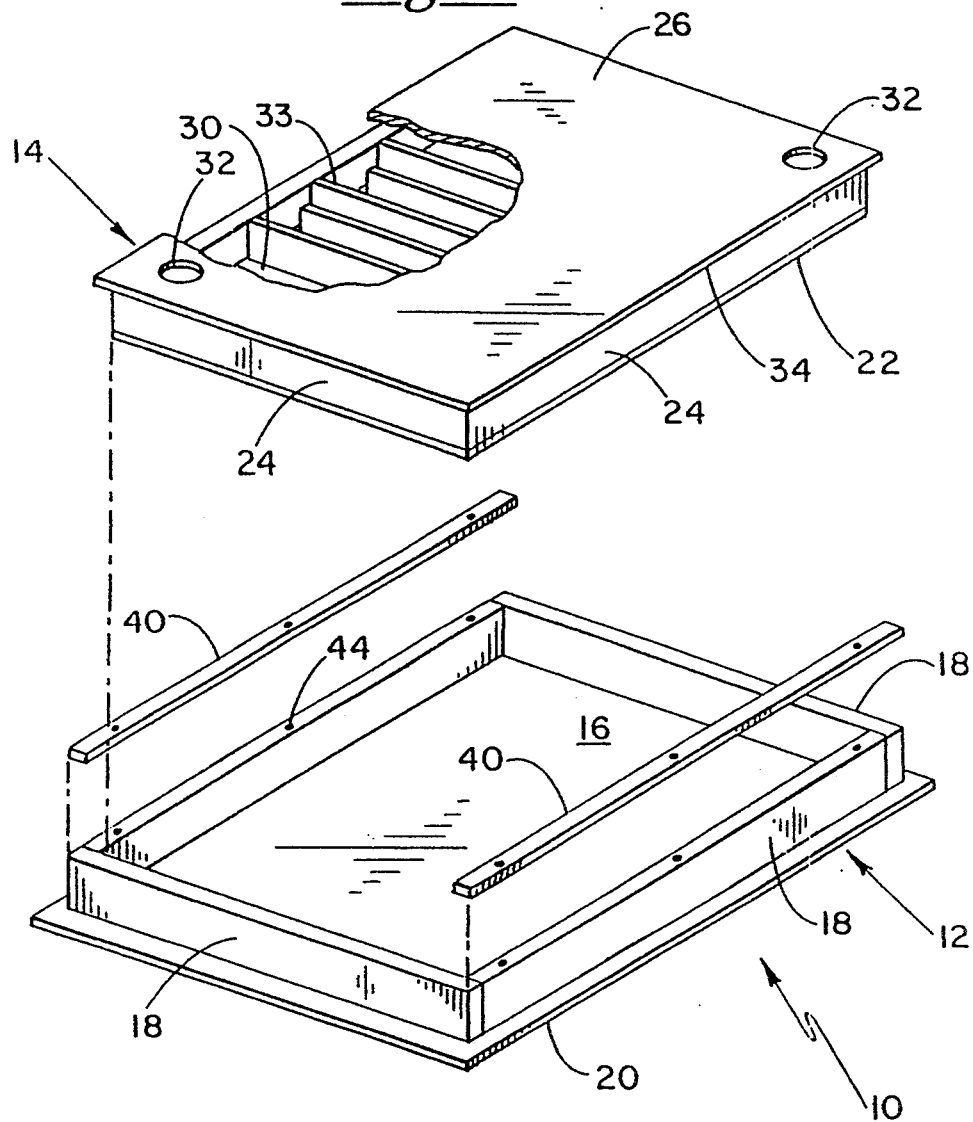
FIG. 1 is an exploded perspective view of a rectangular thermoplastic mold including shims for selectively defining a mold cavity of pre-determined height. The height of the formed cavity is identical to the thickness of each of the shims.

Referring now to FIG. 1, an exploded perspective view of a thermoplastic mold for forming large plastic building sheets according to the preferred embodiment of the present invention is illustrated and generally shown at 10. Mold 10 comprises a bottom member 12, and a top member 14 which is adapted to be received within a recess 16 formed in bottom member 12. Recess 16 is defined by four rectangular side wall plates 18, and a bottom plate 20. Both bottom plate 20 and side wall plates 18 are comprised of a rigid thermally conductive material such as aluminum. Each of side walls 18 are welded to one another along an inside edge, and to bottom member 20 along a bottom inside edge thereof to provide a liquid seal between recess 16 and the ambient.

Top member 14 is comprised of a base plate 22, four side wall members 24, and a top plate 26, each of which is comprised of a rigid thermally conductive material such as aluminum. Each of side walls 24 is welded along a full length inside edge to both base plate 22 and top plate 26, and along adjoining inside edges with one another. Base plate 22, side walls 24 and top plate 26 together define a chamber 30 within top member 14 which is used for cooling top member 14. The welding just described provides a fluid seal between cavity 30 and the ambient. A pair of tapped openings 32 are defined through top plate 26 to allow injection of a fluid from standard conduit-through one opening, and removal from the other. Consequently, fluid, such as air or water, can be circulated through cavity 30 to cool base plate 22.

A plurality of plates or ribs 33 are vertically oriented within cavity 30 and extend across top member 14 in the lateral direction. Alternating plates 33 are connected along one end by welding to an adjacent side wall of cavity 30, wherein the opposite ends are spaced from the opposite side wall to facilitate a serpentine-like passageway between openings 32. Thus, a fluid circulated throughout cavity 30 via the passageway will traverse across a substantial portion of bottom plate 22. When mold 10 is utilized in a molding process, the heat communicated to the mold to melt thermoplastic chips disposed within recess 16 can subsequently be quickly removed therefrom by the fluid so that top member 14 can be removed from bottom member 12. Each of plate members 33 have a height identical to side walls 24, and extend from bottom plate 22 to top member 26 within cavity 30. Each of plates 32 are also comprised of a rigid thermally conductive material, such as aluminum.

The height dimension (thickness) of bottom plate 22 in combination with the height dimension of side walls 24 is identical to the height dimension of side walls 18 of bottom member 12, which is the depth of recess 16. Top member 26 extends over side walls 18 and forms a flange 34 about a periphery of top member 14 such that the flange 34 overhangs the top surface of each side member 18. Thus, when plate 22 of top member 14 is inserted into recess 16 of bottom member 12 such that flange 34 of top member 12 rests upon the top surface of side members 18, no cavity is formed between bottom member 22 and bottom plate 20.

A pair of elongated rectangular shims 40 are adapted to be secured to the top surface of oppositely disposed side members 18. Fasteners 42 are selectively disposed therethrough into corresponding tapped holes 44 defined in the top surface of respective side members 18 to secure the respective shim 40 thereto. Each shim 40 is comprised of a rigid, thermally-conductive material, such as aluminum, each having an identical thickness (height). Thus, when top member 14 is adapted to bottom member 12, the flange 34 of top member 14 will rest upon each shim member 40, and a cavity having a height dimension identical to the height dimension of shim 40 will be defined between bottom member 22 of top member 14, and bottom plate 20 of bottom member 12. Thus one key feature of the present invention is that shims 40 allow one to selectively define the height dimension of a cavity defined between top member 14 and bottom member 12 and therefore the thickness of the panel being molded. By utilizing shims 40 of different thicknesses (height), cavities of identical thicknesses can be selectively created between bottom plate 22 and bottom plate 20. Hence, a single mold 10 can be utilized for creating plastic panels of various and predetermined thicknesses.

Figure 2:
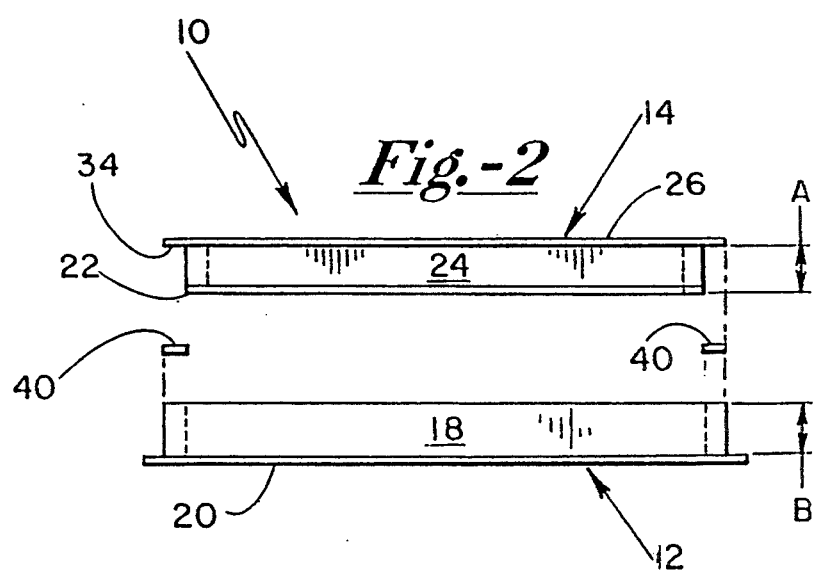
FIG. 2 is an exploded side view of the thermoplastic mold shown in FIG. 1 illustrating how the top member is received within the bottom member, wherein the height of the received portion of the top member is identical in height to the recess formed in the bottom member.

Referring to FIG. 2, a side view of the arrangement shown in FIG. 1 is illustrated. As shown, the flanges 34 of top member 14 are adapted to overhang above the top surfaces of side walls 18. As shown, the height dimension of bottom plate 22 in combination with side wall 24, represented as dimension A, is identical to the height dimension of recess 16, represented as dimension B. The surface area and profile of bottom plate 22 is substantially identical to the profile and surface area of bottom plate 20 within recess 16. Thus, when thermoplastic chips are disposed within recess 16 and subsequently melted by heating both the bottom member 12 and the top member 14, the thermoplastic chips (not shown) will melt within the defined cavity, but will not seep upward between side walls 24 and side walls 18. To obtain a plastic sheet having a desired and uniform color on one side, a thin layer of an extruded thermoplastic material (not shown) having a desired color can be first laid in recess 16 upon bottom member 20 before inserting thermoplastic chips. Upon heating mold 10, the colored material will melt with and bond to the melted thermoplastic chips. A second thin layer of colored thermoplastic material can also be laid across the chips to obtain a sheet colored on both sides.

While elongated shims 40 are illustrated and preferred in the present invention, equivalent height adjustment or shim mechanisms are contemplated, such as a plurality of spaced apart shims adapted at one or more locations along the top surface of side members 18. In yet another equivalent embodiment, top lid 26 can be defined with a sufficiently large flange 34 such that shims 40 can be secured to the underside of flange 34 rather than to the tops surfaces of side members 18 to obtain an equivalent function. It is preferred that shims 40 be disposed along the longer side walls 18. However, a shim 40 having a length identical to the shorter side walls 18 could be implemented as well, wherein the shims would be secured to the top surfaces of the respective side walls 18. Thus, limitation to shims 40 being adapted to the longer walls 18 of rectangular shaped bottom member 12 is not to be inferred.

Referring now to FIG. 3, an alternative embodiment of the invention is illustrated. As shown, mold 50 comprises bottom member 12 previously described and illustrated in FIG. 1 and 2. However, a top member or lid 52 is implemented in place of top member 14 shown in FIG. 1. Lid 52 comprises a single rectangular sheet of aluminum having a profile substantially identical to the profile of recess 16 defined in bottom member 12. A rectangular aluminum plate 54 is secured to the underside of a platen 56, wherein platen 56 forms a portion of a platen press, such as taught in U.S. Pat. No. 3,759,649 wherein platen 56 is similar to platen 36 disclosed therein, the teachings of which are incorporated herein by reference. Plate 54 has a profile similar to, but slightly smaller than, the profile of lid 52. In this embodiment, the combined thicknesses of plate 54 and lid 52 is identical to the depth dimension of recess 16 of bottom member 12 formed by side members 18. A pair of shims 40 are implemented in a manner similar to that described in reference to FIG. 1. Namely, each shim 40 is an elongated rectangular piece of aluminum which is secured to an upper surface of opposite respective side members 18 by fasteners 42.

Since the height dimension of lid 52 in combination with plate 54 is identical to the depth of recess 16, when platen member 56 is stroked downward, plate 54 will press lid 52 into recess 16 of bottom member 12 to compress the heated thermoplastic chips. When platen 52 is stroked downward, a bottom surface 58 of platen 56 will eventually engage each of the respective shims 40. A cavity is thus formed and between lid 52 and bottom plate 20 of bottom member 12 having a height dimension equal to the thickness of each shim 40. Thus again, a mold cavity is defined having a height dimension equal to the thickness of shims 40, wherein a single mold 50 can be implemented with shims 40 of various thicknesses to create plastic panels of a selected thickness.

In this embodiment, lid 52 is disposed within recess 16 a selected distance during pressing wherein the top surface of plate 52 is usually disposed within recess 16 below the top surface of side members 18. (See FIG. 4). Consequently, a means for conveniently removing lid 52 from recess 16 after a pressing cycle is desirable. Referring to FIG. 4, one such apparatus for providing a handle is shown. Specifically, an aluminum disc 60 is secured to lid 52 and above a recess defined thereunder within lid 52 to provide a handle. An opening is defined through a central location of disc 60, defined by a larger opening 62 with an elongated narrower opening 64 extending therefrom in the radial direction.

Referring to FIG. 5, a circular recess 66 is defined within lid 52. Recess 66 has a diameter less than a diameter of disc 60, wherein a concentric shoulder 71 is defined for receiving disc 60. A plurality of screws 68 are inserted through respective tapped holes defined within lid 52 from an underside thereof, and into respective threaded openings defined within disc 60 to secure disc 60 to lid 52. As shown, disc 60 has an upper surface which is flush with a top surface of lid 52 such that plate 54 of platen 56 (see FIG. 3) can apply an even pressure across lid 52. A cavity 70 is defined between disc 60 and recess 66 such that a prying bar 72 having a pivoting extracting member 74 can be adapted to plate 52 to facilitate removal of lid 52 from bottom member 12. A lower T-shaped protrusion extends from the lower end of member 74 and is defined by a cylindrical segment 76 extending to a circular disc 78 having a diameter larger than segment 76. To remove lid 52 after a pressing operation, disc 78 is inserted through opening 62 of disc 60, and then slid in the lateral direction such that segment 76 slides within opening 64. Subsequently, pry bar 72 can be used and leveraged upon an adjacent shim 40 such that member 78 will engage the bottom surface of disc 60 to urge disc 60 and lid 52 upward and out from recess 16 of bottom member 12. A plurality of discs 60 can be adapted to lid 52, preferably, one at each corner, and two at intermediate locations along the longer outer surface of lid 52, for a total of eight discs per lid 52.

Figure 6:
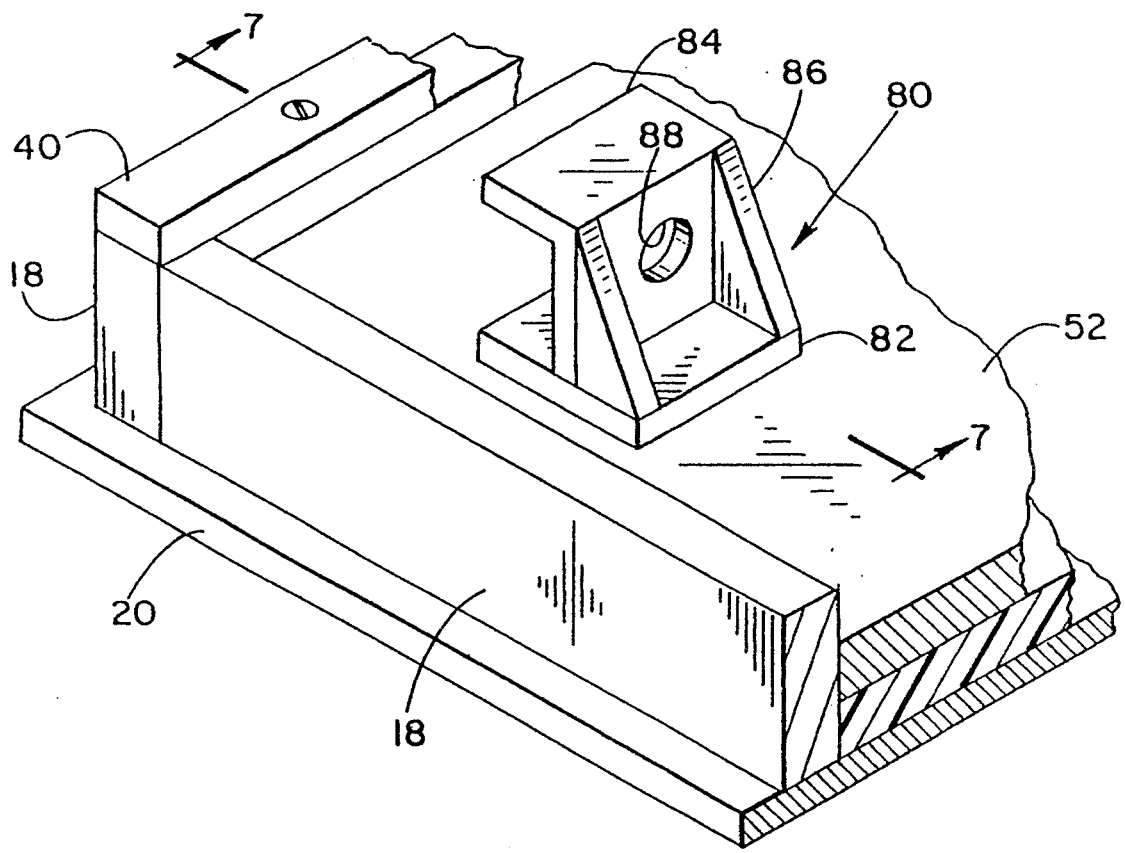
Figure 7:
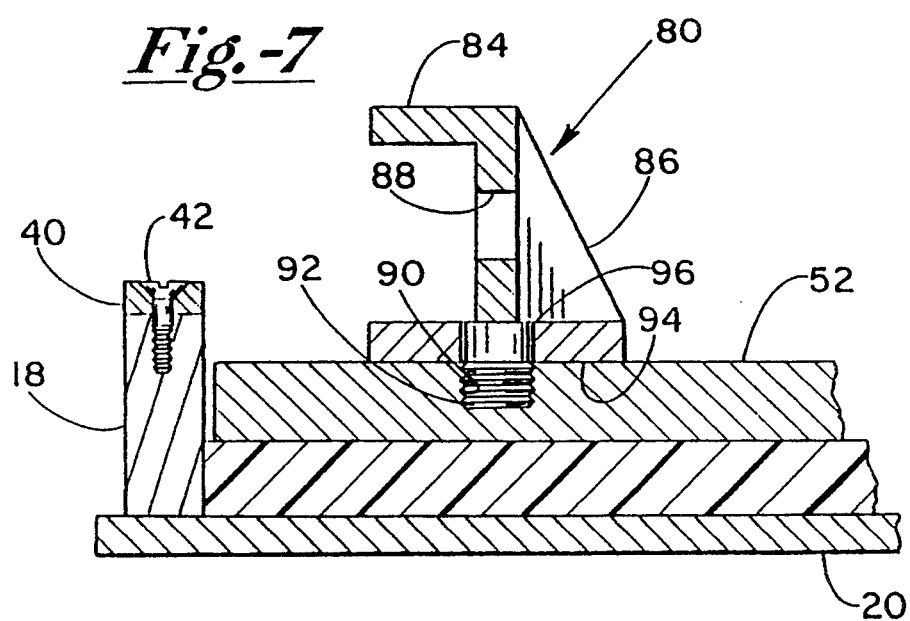
FIG. 7 is a side sectional of the lid shown in FIG. 6 received within the bottom member.

Referring now to FIGS. 6 and 7, an alternative embodiment of a handle or lifting mechanism is illustrated. In this embodiment, a handle 80 is defined by an aluminum bottom plate 82, an upward extending L-shaped lifter member 84, and a pair of support gussets 86 having a triangular shape to re-enforce member 84 with respect to plate 82. An opening 88 is defined through a central location of the vertical portion of member 84. A lifter member handle 80 is preferably defined at various locations of lid 52 as previously described. The horizontally extending or flange portion of member 84 provides a lifting point for receiving the prying end of a pry bar, such as end 73 shown in FIG. 5, wherein adjacent shim 40 provides a leveraging point. Opening 88 is provided to accept a pin or hook, which may be adapted to a crane or a hoist. Each handle 80 can be selectively adapted to lid 52 after a pressing operation to facilitate removal of lid 52.

Referring to FIG. 7, lid 52 has a tapped recess 90 for receiving a bolt 92. Bolt 92 has one end disposed in a recess 96 defined in a bottom surface 94 of plate 82 at a central location beneath member 84, and welded thereto. To insure that the lip of member 84 extends towards a periphery of lid 52 when adapted thereto and tightened, bolt 92 is first screwed firmly into tapped hole 92 of lid 52 until the upper end of bolt 92 is flush with the top surface of lid 52. Next, plate 82 is tack welded to the top of bolt 92, then the combination is removed from lid 52 by unscrewing. Finally, bolt 92 is firmly attached to plate 82 by providing good solid welds between bolt 92 and bottom surface 94. Thus, when finished handle 80 is adapted to lid 52 at each of the selected locations after a pressing operation, the lip of member 84 will always extend outward and toward adjacent shim 40, as shown in FIG. 7. Hand tightening of handle 80 is sufficient. The total number of handles 80 is dependent on how many molds can be cooled, and emptied of formed plastic sheets at one time. Handles 80 are preferably adapted to handle 52 after cooling of the molds is complete. Since tapped hole 90 only extends a portion of the way into lid 52 from an upper surface thereof, the bottom surface of lid 52 is continuous and not perforated by hole 90.

Referring to FIG. 1, in the preferred embodiment the dimensions of bottom plate 22 is $51\frac{1}{2}'' \times 99\frac{1}{2}''$, and $\frac{1}{4}''$ thick; side members 24 are $1\frac{3}{8}''$ in height and $\frac{1}{2}''$ thick; and top plate 26 is $53'' \times 101'' \times \frac{1}{4}''$ thick such that lip 34 extends $\frac{3}{4}''$ beyond the respective side member 18. The outer dimension of profile formed by side members 18 is preferably $53'' \times 101''$ and $1\frac{5}{8}''$ in height, thus the height of bottom plate 22 in combination with the height of side members 24 is identical to the height of bottom members 18 at $1\frac{5}{8}''$. Bottom plate 20 preferably has a dimension of $54'' \times 102''$ and $\frac{1}{4}''$ thick The inside dimensions of recess 16 is thus $52'' \times 100''$, which is slightly greater than $4' \times 8'$. Each of plates 33 are preferably $49\frac{1}{2}''$ long, $1\frac{3}{8}''$ high and $\frac{1}{4}''$ thick. Openings 32 are preferably $\frac{3}{4}''$ in diameter, and are tapped to receive a nipple of a standard conduit. The quantity of thermoplastic chips disposed within recess 16 prior to pressing is determined by weight. Given these preferred dimensions of mold 10, 20 pounds of thermoplastic chips, when melted, will realize a thermoplastic sheet $\frac{1}{8}''$ thick. Similarly, 40 pounds of chips will realize a sheet $\frac{1}{4}''$ thick. Hence, undersupplying or oversupplying thermoplastic chips into recess 16 is prevented by supplying a quantity of chips of a predetermined weight to obtain a sheet of a predetermined thickness.

Referring to the alternative embodiment of the present invention as shown in FIG. 3, plate 52 is preferably $51\frac{1}{2}'' \times 99\frac{1}{2}''$ and $\frac{1}{2}''$ thick, wherein plate 54 is preferably $47\frac{1}{8}'' \times 95\frac{1}{8}''$ and $\frac{3}{4}''$ thick. In this embodiment, side members 18 have a height dimension of $1\frac{1}{4}''$ which is identical to the height of plate 54 in combination with lid 52.

While these dimensions are preferred, limitations to these dimensions is not to be inferred for plastic sheets can be created having different dimensions and thicknesses by modifying the respective dimensions of the appropriate mold elements.

OPERATION

To use the preferred embodiment of the invention, upon selecting the thickness of a desired plastic sheet to be formed, one selects a pair of shims 40 equal in thickness to the desired thickness of the sheet to be formed. Each shim 40 is fastened to an upper surface of the two longer opposed side members 18 of bottom member 12 using a plurality of fasteners 42. Next, an appropriate quantity of recycled thermoplastic chips, determined by weight and corresponding to the thickness of a desired sheet, is disposed within recess 16 of bottom member 12. A thin colored sheet of thermoplastic material can be disposed within recess 16 prior to inserting the thermoplastic chips if a sheet colored on one side is desired. A second sheet of colored material can also be disposed across the chips to obtain a sheet colored on both sides if desired. Next, top member 12 is positioned over recess 16, wherein the corners of plate 22 are positioned over corresponding corners of recess 16 defined in bottom member 12. The heated platen of a platen press, such as is taught in U.S. Pat. No. 3,759,649, then presses the recycled plastic chips by urging top member 14 into bottom member 12 to compress the plastic chips while applying heat to mold 10 through conduction. The platen is heated using heated oil (not shown) disposed therein, such as in the cavity defined in platen 36 taught in the '649 patent. For instance, if polyethylene chips are used, the mold 10 would be heated to about 110 degrees Farenheit, and if polyurethane chips are used, a temperature of about 600 degrees Farenheit would be established. However, limitation to these temperature ranges for melting thermoplastic chips is not to be inferred. Since each of the mold elements, namely top and bottom members 14 and 16, respectively, are comprised of thermally conductive aluminum material, heat generated in the platen is subsequently communicated to the recycled thermoplastic chips such that they achieve a liquid state. The press will continue to urge bottom plate 22 and side members 24 of top member 14 into recess 16 until the flanges 34 of top member 26 engage shims 40. Subsequently, a liquid cooling fluid is communicated between the pair of openings 32 such that the cooling material is circulated throughout the passageway defined within top member 14. The cooling fluid removes heat from bottom member 22 to cool the mold and the liquid plastic disposed within the cavity of mold 10. After mold 10 has been subsequently cooled, top member 14 can be removed from bottom member 12 to access the produced plastic sheet.

In summary, a unique method and apparatus for forming plastic panels from recycled thermoplastic chips is disclosed. The mold provides a unique arrangement implementing shims to create a cavity between the top and bottom members of the mold such that plastic sheets of selected thicknesses can be manufactured. The molding process is quick and efficient, wherein the molds disclosed can be implemented in presently available molding presses. Since the top members can be quickly cooled, the production rate for forming plastic sheets is acceptable. While the mold disclosed is ideal for forming plastic sheets of recycled thermoplastic materials, it is recognized that sheets comprised of other materials, can be formed such as laminated glued wood objects including laminated table tops, cabinet walls, top panels, or the like.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

I claim:

1. A method of forming a plastic sheet from thermoplastic material using, in combination, a platen press having a platen member for applying a force; and a mold, comprising:

(a) a bottom member having a bottom surface and a plurality of side walls defining a recess, said side walls defining a profile of said recess and each said side wall having a top surface;

(b) a top member having an upper and a lower surface, and a profile corresponding to the profile of said recess and adapted to be entirely received within said recess, said lower surface of said top member and said bottom member bottom surface defining a cavity therebetween; and (c), shim means independent of said top member for selectively establishing a depth of the cavity defined between said top member and said bottom member by limiting the extent which said platen member can apply force to said mold top member when forced into said recess, said shim means being disposed between said platen member and said top surface of said bottom member side walls when said platen member applies force to said top member, whereby said top member is entirely received within said recess when said shim means disposed upon platen member engages said bottom member side walls, comprising the steps of:

(i) selecting a desired thickness of the plastic sheet to be formed;

(ii) positioning said shim means above the top of two opposing said side walls, said shim means establishing a spacing between the top surface of said side walls and said platen member proportional to the desired thickness of the plastic sheet;

(iii) disposing a preselected quantity of the thermoplastic material in said recess of said bottom member; and (iv) compressing said thermoplastic material with said top member by using said platen member to urge said top member entirely into said recess of said bottom member until said platen member engages said shim means, while heating said top and bottom member.

2. The method as specified in claim 1 wherein the spacing established between the top surfaces of said side walls and said top member is identical to the desired thickness of the plastic sheet.

3. The method as specified in claim 1 further comprising the step of inserting a thin sheet of colored thermoplastic material in said recess, between said plastic material and either said top or bottom member prior to compressing.

4. The method as specified in claim 1 further comprising the step of cooling the top and bottom member after compressing the thermoplastic material.

5. In combination, a platen press having a platen member for applying a force; and a mold comprising:

(a) a bottom member having a bottom surface and a plurality of side walls defining a recess, said side walls defining a profile of said recess and each said side wall having a top surface;

(b) a top member having an upper and a lower surface, and a profile corresponding to the profile of said recess and adapted to be entirely received within said recess, said lower surface of said top member and said bottom member bottom surface defining a cavity therebetween; and (c) shim means independent of said top member for selectively establishing a depth of the cavity defined between said top member and said bottom member by limiting the extent which said platen member can apply force to said mold top member when forced into said recess, said shim means being disposed between said platen member and said top surface of said bottom member side walls when said platen member applies force to said top member, whereby said top member is entirely received within said recess when said platen member engages said shim means disposed upon bottom member side walls.

6. The combination as specified in claim 5 wherein said platen member further comprises a platen plate extending downwardly therefrom, said platen plate having a lower surface less in area than an area of said top member upper surface such that one can visually monitor said top member as it is pressed into said lower member recess by said platen plate.

7. The combination as specified in claim 5 wherein said top member profile is substantial identical to said recess profile.

8. The combination as specified in claim 5 wherein said top member upper surface has integral handle means for facilitating removal of said top member from said recess after being pressed into said recess by said platen press.

9. The combination as specified in claim 8 wherein said top member comprises a plate.

10. The combination as specified in claim 8 wherein said handle means comprises an integral recess with a cantilevered lip.

11. The combination as specified in claim 10 wherein said handle means comprises a slot with an enlarged opening at one end thereof.

12. The combination as specified in claim 5 wherein said shim means comprises a pair of shim each adapted to be disposed upon said top surfaces of opposite said bottom member side walls, and said cavity depth corresponds to a height of said shims.

13. The combination as specified in claim 12 wherein said shims extend the entire length of said respective side wall.

14. The combination as specified in claim 13 wherein said shims have an identical height.

* * * * *